United States Patent [19]
Kazuo

[11] 3,943,567
[45] Mar. 9, 1976

[54] EJECTION DEVICE FOR TAPE CARTRIDGE

[76] Inventor: Kawasaki Kazuo, No. 8-3, 2-chome, Majarimatsu, Hatano, Kanagawa, Japan

[22] Filed: June 12, 1973

[21] Appl. No.: 369,205

[30] Foreign Application Priority Data
Nov. 21, 1972 Japan.............................. 47-116240

[52] U.S. Cl. ................................................. 360/93
[51] Int. Cl.² ........................................... G11B 5/00
[58] Field of Search ................................. 360/93–96

[56] References Cited
UNITED STATES PATENTS

| | | | |
|---|---|---|---|
| 3,485,500 | 12/1969 | Loeschner et al. .................... | 360/93 |
| 3,608,908 | 9/1971 | Yamamoto et al. ................... | 360/96 |
| 3,633,922 | 1/1972 | Yokota ................................. | 360/93 |
| 3,642,288 | 2/1972 | Camras ................................. | 360/93 |
| 3,703,295 | 11/1972 | Yamamoto et al. ................... | 360/94 |
| 3,779,482 | 12/1973 | Chimura .............................. | 360/96 |
| 3,805,289 | 4/1974 | Guyton et al. ....................... | 360/93 |

*Primary Examiner*—Stanley M. Urynowicz, Jr.
*Attorney, Agent, or Firm*—McGlew and Tuttle

[57] ABSTRACT

An ejecting device for a tape record cartridge capable of being incorporated in a combination set of radio comprising a push-button and a record player, comprises a detent roller device for detaining the tape cartridge, a solenoid device which actuates the detent roller device, and a switching device linked with the push-button system of the radio set.

3 Claims, 3 Drawing Figures

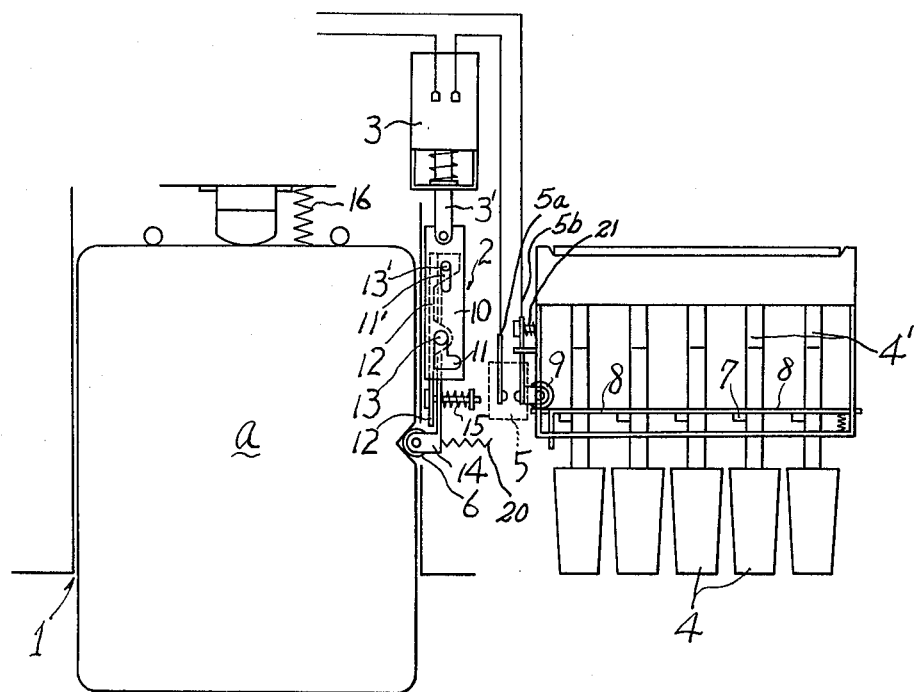
Fig 1
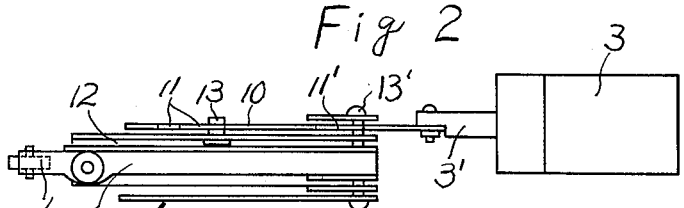
Fig 2
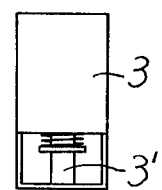
Fig 3
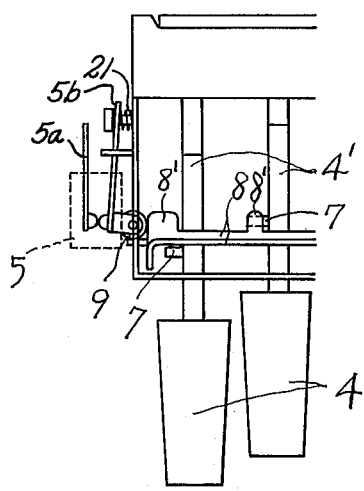
Fig 4
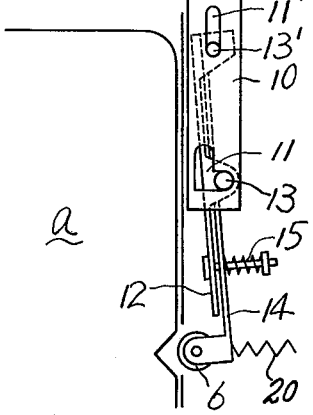

EJECTION DEVICE FOR TAPE CARTRIDGE

SUMMARY OF THE INVENTION

This invention relates to an ejecting device for a tape record cartridge, more particularly to a tape cartridge ejecting device which can be neatly and advantageously incorporated in any conventional radio-record player set employing a push-button system.

The tape cartridge ejecting device in accordance with this invention characteristically comprises a detent roller device for detaining the tape cartridge, a solenoid device which actuates the detent roller device, and a switching device linked with the push-button system of the radioset.

The object of this invention is to provide an improved tape ejecting device which can be advantaageously employed in combination with any conventional push-button type ratio-record player set.

Other objects and advantages of this invention will become apparent from the following description and accompanying drawings forming parts of this invention.

IN THE DRAWINGS

FIG. 1 is a plan view of the ejecting device in accordance with this invention, with the tape cartridge inserted and detained in the socket.

FIG. 2 is a side view of the detent roller device, for detaining and releasing the tape cartridge, linked to a solenoid device.

FIG. 3 is a partial plan view of the above devices, with the detent roller releasing the tape cartridge.

FIG. 4 is a plan view of the switching device with the pushbutton depressed and the contact points closed.

FIG. 5 is a left side view, partly cut away, of the push button system.

DESCRIPTION OF THE PREFERRED EMBODIMENT

Referring now to the drawings, particularly to FIG. 1, the tape cartridge ejecting device in accordance with the invention includes the detent roller device 2 for detaining and releasing the tape cartridge (a) being inserted in the socket 1, the solenoid device 3, whose rod 3' is connected to detent roller device 2, and the switching device 5 consisting of the switching or contact plates 5a and 5b and the terminal roller 9 which is operated by the action of the push-button system.

As shown more in detail in FIGS. 2 and 3, the detent roller device 2 is formed as follows: The detent roller 6 is held by brackets of the lower end of the holding plate 14, and the holding plate 14 is supported on the supporting plate 12 having the side projection 13. The top of the supporting plate 12 is pivotal around the upper pin 13', and further the supporting plate 12 is slidably engaged with the sliding plate 10 by means of the side projection or lower pin 13 and the pivot pin 13'. Sliding plate 10 has the L-shaped and I-shaped slots 11 and 11', respectively through which the lower pin 13 and the pivot pin 13' extend. The holding plate 14 is forced to abut against the supporting plate 12 by the action of the compression spring 15. There is illustrated in FIG. 1 another compression spring 16 at the bottom of the socket 1, which spring serves to force out the tape cartridge (a).

Further referring to the switching device 5 linked with the pushbutton system, as shown in FIGS. 1 and 4, the switching device 5 comprises the switching or contact plates 5a and 5b and the terminal roller 9. The terminal roller 9 is so arranged that the contact points on plate 5a and 5b are closed when anyone of the plurality of push-buttons is depressed. More detailed, there is provided the side claw 7, as shown in FIGS. 1 and 4, on each push-button rod 4' engaging with the ear 8' of the horizontal lever 8 which is twistable about end projections 17, as shown in FIG. 5, by the action of the said claw 7. A compression spring 21 engaged with plate 5b biases plate 5b counterclockwise to maintain the contact points on plates 5a and 5b normally out of engagement.

The lefthand end portion of lever 8 is bent at a right angle to form a sector 19 which contacts terminal roller 9, mounted on one end of terminal plate 18, as shown in FIGS. 1, 4 and 5.

For ejecting the tape cartridge (a) out of the socket 1, any one of the push-button 4 is depressed. As shown in FIG. 4, when any push-button is depressed, the horizontal lever 8 is twisted because one of its 3 ears 8' is pushed by a side claw 7. With the lever 8 twisted as shown in FIGS. 4 and 5, sector 19 forces the terminal roller 9 sideward and thus closes the contact points. Consequently, the electric current flows to the solenoid device 3 to drag the rod 3' inwardly. When the rod 3' is dragged inwardly, the sliding plate 10 linked thereto is also dragged toward the solenoid device 3, thus leaving the side projection pin 13 and the pivot pin 13' respectively at the lower end of the L-shaped and I-shaped slots 11 and 11'. Under such a condition, the side projection pin 13 can move into the recess of the L-shaped slot 11 under the bias of a tension spring 20 connected to holding plate 14. Thus, both the holding and supporting plates 12 and 14 as well as the detent roller 6 are released. Accordingly, the tape cartridge (a) can easily be ejected by the aid of the compression spring 16 to a position from where the tape cartridge (a) can be taken out manually. When the push-button is pulled back, the horizontal lever 8 is twisted back since the ear 8' is freed from the action of the claw 7. Accordingly, the terminal roller 9 can return back, thus opening the contact points. In turn, the solenoid device 3 releases the rod 3' to move outwardly, thus pushing the sliding plate 10 linked thereto to the original position. As shown in FIG. 1, the pin 13' and the side projection pin 13 are forced again to the upper ends of the slots 11' and 11. The detent roller 6 is forced again to detain the tape cartridge in the socket.

While only one embodiment of the invention has been illustrated and described, it is understood that alternative modification and changes may be made without departing from the scope and spirit thereof as defined by the appended claim.

What is claimed is:

1. In a push-button operated set, arranged to have a tape record cartridge inserted thereinto, and having a plurality of push-buttons, a cartridge ejecting device comprising, in combination, latch means operable to engage an inserted tape cartridge to retain the cartridge in operative relation; a solenoid operatively associated with said latch means and operable, when energized, to disengage said latch means from the cartridge; means operable, responsive to such disengagement of said latch means, to effect at least partial ejection of the cartridge; an energizing circuit for said solenoid including, in series, a normally open switch; and means operable, responsive to operation of a push-button, to close said switch to energize said solenoid; said latch means comprising a holding plate; a roller mounted at an end of said holding plate and engageable in a recess in a cartridge; a supporting plate; means biasing said holding plate into engagement with said supporting plate; a sliding plate adjacent said holding plate and connected to said solenoid for movement thereby; said sliding plate being formed with a rectilinear slot adjacent its end connected to said solenoid, and with a L-shape slot adjacent its opposite end; a pin engaged in said rectilinar slot and forming a pivot for said supporting plate; a projection on said supporting plate engaged in said L-shaped slot; said pin and said projection normally engaging those ends of their respective slots nearer to said solenoid and, upon movement of said sliding plate toward said solenoid responsive to energization of said solenoid, engaging the opposite ends of their respective slots whereby said projection is at the junction of the two legs of said L-shape slot so that said supporting plate and said holding plate may pivot about said pin for release of said roller from the recess in the cartridge.

2. In a push-button operated set, arranged to have a tape record cartridge inserted thereinto, and having a plurality of push-buttons, a cartridge ejecting device comprising, in combination, latch means operable to engage an inserted tape cartridge to retain the cartridge in operative relation; a solenoid operatively associated with said latch means and operable, when energized, to disengage said latch means from the cartridge; means operable, responsive to such disengagement of said latch means, to effect at least partial ejection of the cartridge; an energizing circuit for said solenoid including, in series, a normally open switch; and means operable, responsive to operation of a push-button to close said switch to energize said solenoid; said normally open switch comprising a relatively fixed contact plate and a relatively movable contact plate; an element displaceable responsive to operation of any push-button and a roller secured to said movable contact plate and positioned in the path of movement of said element to close said normally open switch responsive to operation of a push-button.

3. A cartridge ejecting device, as claimed in claim 2, in which each push-button includes a rod having a claw extending laterally therefrom; said displaceable element comprising a plate twistable about projections at each end; said plate having a sector at one end extending perpendicularly thereto and positioned for engagement with said switch-operating roller; said element, responsive to operation of a push-button, being twisted by engagement of the side projection on the rod of the associated push-button to swing said sector into engagement with said switch-operating roller to close said switch to energize said solenoid.

* * * * *